G. E. DYER & S. R. LEAN.
CASING FOR CONDENSING LENSES OF CINEMATOGRAPH LANTERNS AND THE LIKE.
APPLICATION FILED MAY 2, 1916.

1,250,820. Patented Dec. 18, 1917.

G. E. Dyer.
S. R. Lean.
Inventors

By
Attorney.

UNITED STATES PATENT OFFICE.

GEORGE EDWARD DYER AND SYDNEY ROCKS LEAN, OF WELLINGTON, NEW ZEALAND.

CASING FOR CONDENSING-LENSES OF CINEMATOGRAPH-LANTERNS AND THE LIKE.

1,250,820.

Specification of Letters Patent.

Patented Dec. 18, 1917.

Application filed May 2, 1916. Serial No. 94,892.

*To all whom it may concern:*

Be it known that we, GEORGE EDWARD DYER and SYDNEY ROCKS LEAN, citizens of the Dominion of New Zealand, and residing at Wellington, in the Dominion of New Zealand, have invented certain new and useful Improvements in Casings for Condensing-Lenses of Cinematograph-Lanterns and the like, of which the following is a specification.

This invention relates to casings, mounts or frames wherein the condensing lenses of cinematograph and similar lanterns are held.

Usually condensing lenses are held in a metal casing, frame or mount, but they frequently break owing to the excessive heat, and the sudden cooling of the lenses while in contact with the metal frame either wholly or partially through their circumferences. Various remedies have been tried to overcome the difficulty, such as forcing a constant stream of cold air through the space between the lenses, or by lining the metal frame with asbestos so as to prevent the lenses from coming into direct contact with the metal frame. These remedies, however, were not successful in avoiding breakages of the lenses.

Our invention consists in providing a semi-circular carrier lined with asbestos, mica or the like, and having grooves for the reception of the lenses. The upper parts of the lenses are quite free and not in contact with the carrier. The lenses lie loosely in the grooves of the carrier and are free to contract and expand without restriction in any direction on the asbestos or mica, which forms a bed and keeps the lenses out of contact with the carrier.

In order to hide the glare of the light, the carrier has a hood above and spaced apart from, the lenses, and for the sake of coolness this hood may be lined with asbestos. A handle on the top of the hood has a bar of material which will not readily conduct heat. The hood is readily removed by means of the handle.

The hood is provided with lugs or feet which engage sockets or the like in the carrier for keeping the hood in correct position on the carrier and so that the hood shall not come into contact with the lenses.

The drawing herewith illustrates the invention and will now be referred to for the purposes of a detailed description:—

Fig. 1, and Fig. 3, is a sectional elevation on line B—B, Fig. 2.

Figure 3:
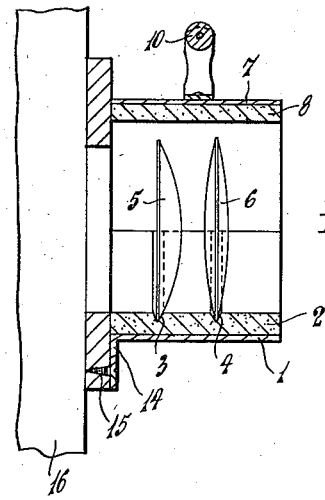
Figure 2:
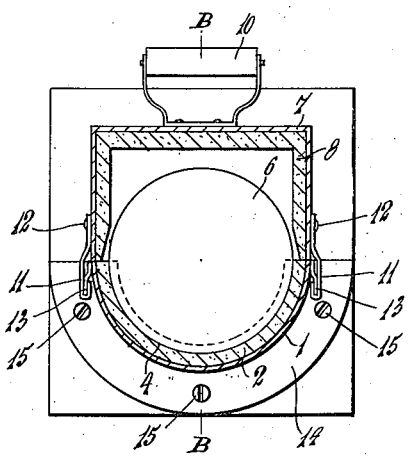
Fig. 2, is a cross section on line A—A.

The casing or carrier 1 is semi-circular and forms a trough shaped receptacle, which is lined with asbestos 2. Circumferential grooves 3 and 4 are made in the asbestos 2 for receiving the edges of the lenses 5 and 6, which are thereby held in an upright position, at a proper distance apart, and loosely so that they are free to expand and contract. The asbestos 2 prevents the lenses from coming into contact with the metal part of the carrier 1.

The upper parts of the lenses are covered by a hood 7 lined with asbestos 8. The hood and its lining do not come into contact with the lenses, but merely prevent the light from shining into the eyes of an operator. The hood has a handle provided with a bar 10 made of material which is a non-conductor of heat.

The hood 7 is fixed to the carrier 1 by hooks 11 or other fastenings pivoted upon pins 12 and adapted to engage catches 13 fixed to the carrier 1.

Figure 1:
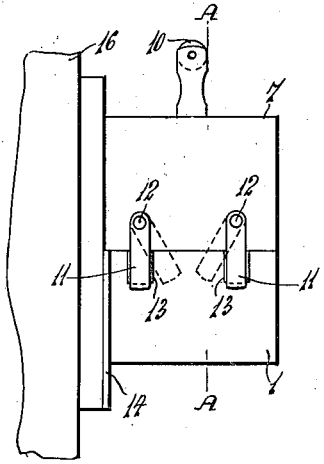
Figure 1, is a side elevation of the device.

To release the hood the hooks 11 are turned aside upon their pins 12, as shown by dotted lines in Fig. 1, until the said hooks are clear of the catches 13.

The carrier 1 is supported in any convenient manner, and in the drawing is shown with a flange 14 held by screws 15 to the front of the lantern 16.

The lenses 5 and 6 stand on their lower edges loosely in the grooves 3 and 4 and are not restrained or confined in any manner, but are free to expand or contract. Consequently the lenses do not crack under varying temperatures.

What we do claim and desire to secure by Letters Patent of the United States is:—

1. A lens mounting comprising a substantially semi-cylindrical supporting member having a semi-circular interior groove in which the lens is loosely supported for free expansion upwardly.

2. A lens mounting as claimed in claim 1, wherein the supporting member is of heat insulating material.

3. A lens mounting as claimed in claim 2, wherein a substantially semi-cylindrical casing supports and incloses said member.

4. A lens mounting comprising a casing inclosing said lens, said casing consisting of a lower substantially semi-cylindrical portion having a semi-circular groove in which the lens is loosely supported and an upper portion spaced from the upper portion of the lens to allow upward expansion movement thereof.

5. A lens mounting as claimed in claim 4, wherein the upper portion of the casing is separate from the lower portion thereof and means are provided for detachably connecting the upper portion to the lower portion.

In testimony whereof we have signed our names to this specification in the presence of two witnesses.

GEORGE EDWARD DYER.
  SYDNEY ROCKS LEAN.

Witnesses:
 ERNEST SMITH BALDWIN,
 JAMES ANDERSON HARDIE.